(12) United States Patent
Yoon et al.

(10) Patent No.: US 12,124,124 B2
(45) Date of Patent: Oct. 22, 2024

(54) DISPLAY DEVICE INCLUDING A CIRCULAR POLARIZER AND METHOD OF MANUFACTURING THE SAME

(71) Applicant: Samsung Display Co., Ltd., Yongin-si (KR)

(72) Inventors: Seon Tae Yoon, Seoul (KR); Jung Hyun Kwon, Seoul (KR); Ki Soo Park, Hwaseong-si (KR); Hae Il Park, Seoul (KR); Moon Jung Baek, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/505,033

(22) Filed: Nov. 8, 2023

(65) Prior Publication Data

US 2024/0077763 A1 Mar. 7, 2024

Related U.S. Application Data

(63) Continuation of application No. 17/988,629, filed on Nov. 16, 2022, now Pat. No. 11,852,916, which is a
(Continued)

(30) Foreign Application Priority Data

Dec. 20, 2016 (KR) .................. 10-2016-0174704

(51) Int. Cl.
*G02F 1/1335* (2006.01)
*G02F 1/13357* (2006.01)

(52) U.S. Cl.
CPC .. *G02F 1/133555* (2013.01); *G02F 1/133512* (2013.01); *G02F 1/133528* (2013.01);
(Continued)

(58) Field of Classification Search
None
See application file for complete search history.

(56) References Cited

U.S. PATENT DOCUMENTS 6,020,945 A 2/2000 Sawai et al.
6,950,159 B2 9/2005 Kubo et al.
(Continued)

FOREIGN PATENT DOCUMENTS

CN 1853135 10/2006
CN 104360534 2/2015
(Continued)

OTHER PUBLICATIONS

Notice of Allowance dated Aug. 23, 2023, issued to U.S. Appl. No. 17/988,629.
(Continued)

*Primary Examiner* — Jennifer D. Carruth
(74) *Attorney, Agent, or Firm* — CANTOR COLBURN LLP

(57) ABSTRACT

A display device including: a first substrate; a transflective layer disposed on a surface of the first substrate; a wavelength conversion layer disposed on the transflective layer; a capping layer disposed on the wavelength conversion layer, a first polarizing layer disposed on the capping layer; and a second polarizing layer disposed on the other surface of the first substrate. The first polarizing layer and the second polarizing layer have different polarization directions.

15 Claims, 17 Drawing Sheets

Related U.S. Application Data continuation of application No. 16/901,153, filed on Jun. 15, 2020, now Pat. No. 11,531,231, which is a continuation of application No. 15/847,653, filed on Dec. 19, 2017, now Pat. No. 10,725,337.

(52) U.S. Cl.
CPC .. *G02F 1/133617* (2013.01); *G02F 1/133531* (2021.01); *G02F 1/133541* (2021.01); *G02F 1/133548* (2021.01)

(56) References Cited

U.S. PATENT DOCUMENTS

| | | | |
|---|---|---|---|
| 7,671,528 | B2 | 3/2010 | Fukuda et al. |
| 7,760,296 | B2 | 7/2010 | Gotink-Meinders et al. |
| 8,482,194 | B2 | 7/2013 | Fukuda et al. |
| 9,195,093 | B2 | 11/2015 | Nam et al. |
| 9,612,472 | B2 | 4/2017 | Wu |
| 9,733,512 | B2 | 8/2017 | Saneto et al. |
| 10,429,690 | B2 | 10/2019 | Park et al. |
| 10,545,365 | B2 | 1/2020 | Kim et al. |
| 10,591,777 | B2 | 3/2020 | Yoon et al. |
| 10,725,337 | B2 | 7/2020 | Yoon et al. |
| 2005/0264735 | A1 | 12/2005 | Tago et al. |
| 2011/0216271 | A1 | 9/2011 | Suzuki et al. |
| 2013/0335799 | A1 | 12/2013 | Yoon et al. |
| 2014/0238952 | A1 | 8/2014 | Makino et al. |
| 2014/0312339 | A1 | 10/2014 | Fujita |
| 2015/0002796 | A1* | 1/2015 | Fukunaga ......... G02F 1/133555 349/106 |
| 2015/0346554 | A1 | 12/2015 | Lee et al. |
| 2017/0235191 | A1 | 8/2017 | Jang et al. |
| 2018/0101060 | A1 | 4/2018 | Cho et al. |
| 2018/0102449 | A1 | 4/2018 | Pschenitzka et al. |
| 2018/0180935 | A1 | 6/2018 | Kim et al. |
| 2018/0341147 | A1 | 11/2018 | Sugitani et al. |

FOREIGN PATENT DOCUMENTS

| | | |
|---|---|---|
| CN | 102890362 | 4/2015 |
| CN | 106066553 | 11/2016 |
| CN | 106094315 | 11/2016 |
| JP | 2005-346047 | 12/2005 |
| JP | 2007-294404 | 11/2007 |
| JP | 2010-287562 | 12/2010 |
| KR | 10-2013-0104862 | 9/2013 |
| KR | 10-2014-0046604 | 4/2014 |
| KR | 10-2016-0030242 | 3/2016 |
| KR | 10-2016-0112499 | 9/2016 |

OTHER PUBLICATIONS

Korean Office Action dated Jan. 16, 2024, in Korean Patent Application No. 10-2016-0174704 (with English translation).

* cited by examiner

DISPLAY DEVICE INCLUDING A CIRCULAR POLARIZER AND METHOD OF MANUFACTURING THE SAME

CROSS-REFERENCE TO RELATED APPLICATIONS

This application is a continuation of U.S. patent application Ser. No. 17/988,629, filed on Nov. 16, 2022, which is a continuation of U.S. patent application Ser. No. 16/901,153, filed on Jun. 15, 2020, now issued as U.S. Pat. No. 11,531,231, which is a continuation of U.S. patent application Ser. No. 15/847,653, filed on Dec. 19, 2017, now issued as U.S. Pat. No. 10,725,337, which claims priority from and the benefit of Korean Patent Application No. 10-2016-0174704, filed on Dec. 20, 2016, which are hereby incorporated by reference for all purposes as if fully set forth herein.

BACKGROUND

Field

Exemplary embodiments relate to a display device and a method of manufacturing the same.

Discussion of the Background

With the development of multimedia, display devices are becoming increasingly important. Accordingly, various types of display devices such as liquid crystal displays (LCDs) and organic light emitting displays (OLEDs) are being used.

Of these display devices, LCDs are the most widely used types of flat panel displays. Generally, an LCD includes a pair of substrates having field generating electrodes, such as pixel electrodes and a common electrode, and a liquid crystal layer interposed between the two substrates. In the LCD, voltages are applied to the field generating electrodes to generate an electric field in the liquid crystal layer. Accordingly, the direction of liquid crystal molecules of the liquid crystal layer is determined, and polarization of incident light is controlled. As a result, a desired image is displayed on the LCD.

Each pixel of the LCD may uniquely display one of primary colors in order to realize a color display. As one method for allowing each pixel to uniquely display one primary color, a method of placing a color filter in each pixel on a light path from a light source to a viewer can be exemplified. The color filter is disposed between two polarizers to realize a primary color by transmitting only a wavelength band of incident light and absorbing the other wavelength bands.

One of the various areas of the development of LCDs is to improve the quality of primary colors displayed by the LCDs. Various different technical directions are presently being pursued in order to provide this improved quality.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device capable of suppressing interference due to external light.

Exemplary embodiments provide a display device having low external light reflectance.

Exemplary embodiments provide a method of manufacturing a display device capable of suppressing interference due to external light.

Exemplary embodiments provide a method of manufacturing a display device having low external light reflectance.

Additional aspects will be set forth in the detailed description which follows, and, in part, will be apparent from the disclosure, or may be learned by practice of the inventive concept.

An exemplary embodiment provides a display device including: a first substrate; a transflective layer disposed on a surface of the first substrate; a wavelength conversion layer disposed on the transflective layer; a capping layer disposed on the wavelength conversion layer; a first polarizing layer disposed on the capping layer, and a second polarizing layer disposed on the other surface of the first substrate. The first polarizing layer and the second polarizing layer have different polarization directions.

The second polarizing layer may be a circular polarizer.

The display device may further include a light blocking filter disposed between the wavelength conversion layer and the first substrate.

The light blocking filter may be disposed between the transflective layer and the wavelength conversion layer.

The transflective layer may be disposed between the light blocking filter and the wavelength conversion layer.

The transflective layer may include a first protective layer, an intermediate layer, and a second protective layer.

The intermediate layer may have a thickness of 100 to 200 Å.

The transflective layer may have a reflectance of 20 to 70%.

The wavelength conversion layer may include a first wavelength conversion layer which emits red light and a second wavelength conversion layer which emits green light.

The display device may further include a light transmitting layer disposed adjacent to the wavelength conversion layer.

The transflective layer may overlap the wavelength conversion layer and may not overlap the light transmitting layer.

The display device may further include a light blocking filter disposed between the first substrate and the wavelength conversion layer. The light blocking filter may overlap the first wavelength conversion layer and the second wavelength conversion layer.

The display device may further include a black matrix disposed between the first wavelength conversion layer and the second wavelength conversion layer.

The display device may further include a third polarizing layer disposed on the transflective layer.

The display device may further include a second substrate facing the first substrate. The third polarizing layer may be disposed between the wavelength conversion layer and the second substrate.

Another exemplary embodiment provides a method of manufacturing a display device. The method includes: forming a transflective layer on a surface of a first substrate; forming a wavelength conversion layer on the transflective layer, forming a capping layer on the wavelength conversion layer; and forming a first polarizing layer on the capping layer and forming a second polarizing layer on the other surface of the first substrate.

The method may further include forming a light blocking filter between the first substrate and the wavelength conversion layer.

The wavelength conversion layer may include a first wavelength conversion layer which emits red light and a second wavelength conversion layer which emits green light, and the light blocking filter may overlap the first wavelength conversion layer and the second wavelength conversion layer.

The method may further include forming a light transmitting layer adjacent to the wavelength conversion layer.

The method may further include etching the transflective layer using the light blocking filter as an etch mask.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
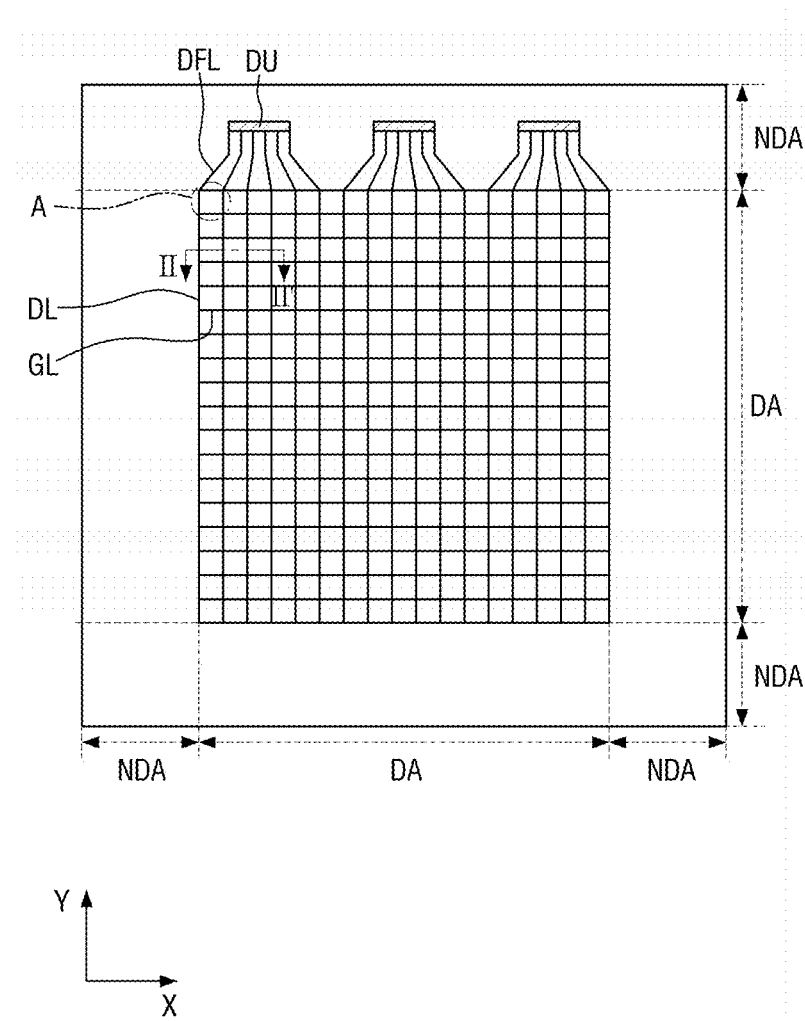
FIG. 1 is a layout view of a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments of the present invention will be described with reference to the attached drawings.

Figure 2:
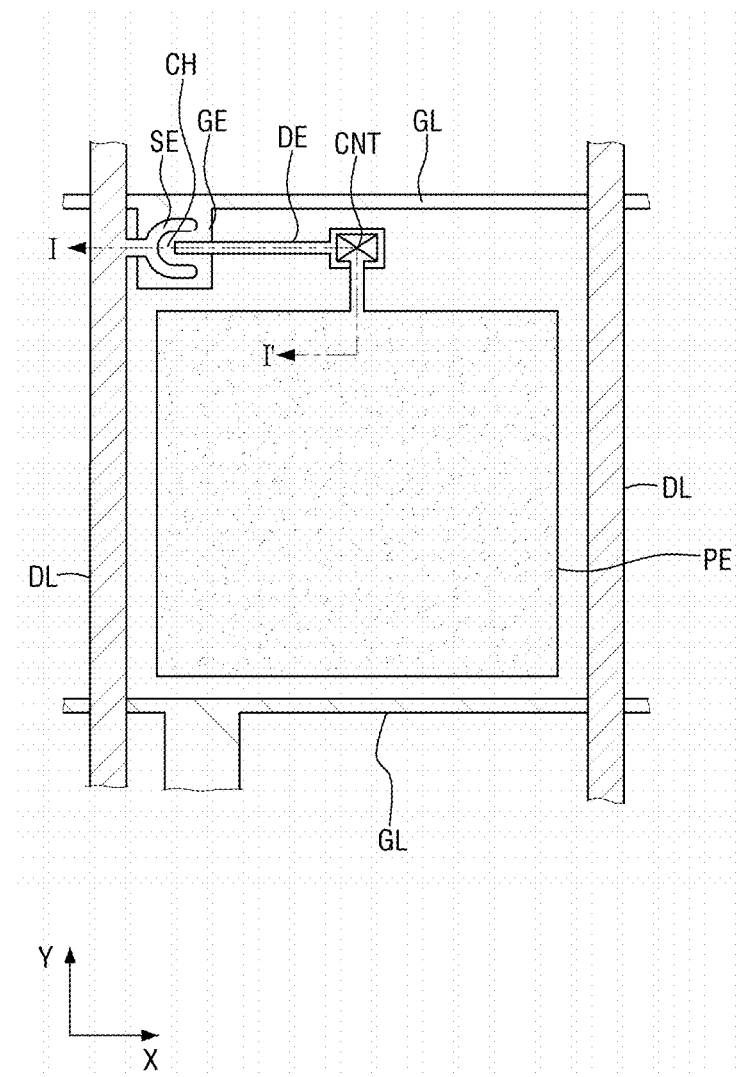
FIG. 2 is an enlarged view of an area 'A' of FIG. 1.
Figure 3:
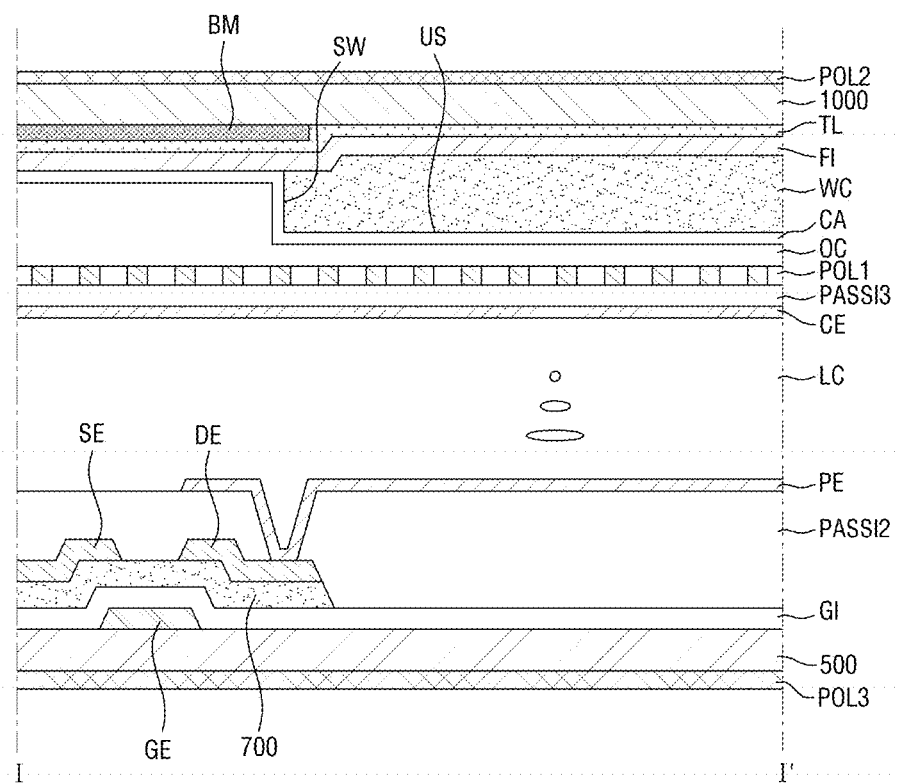
FIG. 3 is a cross-sectional view taken along the line I-I' of FIG. 2.
Figure 4:
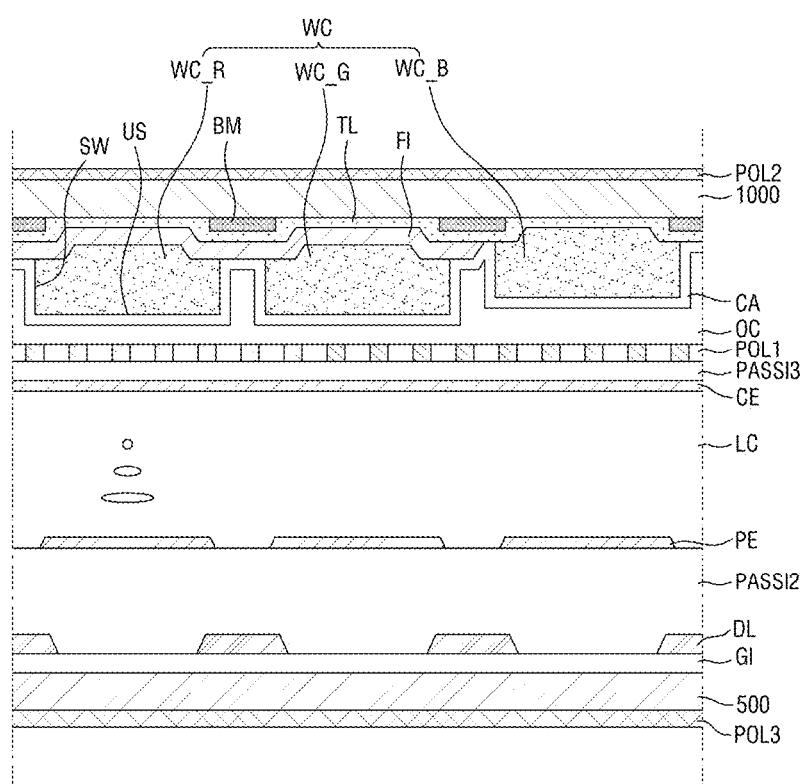
FIG. 4 is a cross-sectional view taken along the line II-II' of FIG. 1.

FIG. 1 is a layout view of a display device according to an embodiment. FIG. 2 is an enlarged view of an area 'A' of FIG. 1. FIG. 3 is a cross-sectional view taken along the line I-I' of FIG. 2. FIG. 4 is a cross-sectional view taken along the line II-II' of FIG. 1.

Referring to FIGS. 1 through 4, the display device according to an exemplary embodiment includes a first substrate 1000, a transflective layer TL disposed on a surface of the first substrate 1000, a wavelength conversion layer WC disposed on the transflective layer TL, a capping layer CA disposed on the wavelength conversion layer WC, a first polarizing layer POL1 disposed on the capping layer CA, and a second polarizing layer POL2 disposed on the other surface of the first substrate 1000.

The first substrate 1000 may be made of a material having heat-resisting and light-transmitting properties. The first substrate 1000 may be made of, but is not limited to, transparent glass or plastic.

The display device according to an exemplary embodiment may include a second substrate 500 facing the first substrate 1000. For ease of description, the second substrate 500 will be described first.

A display area DA and a non-display area NDA may be defined on the second substrate 500.

The display area DA is an area where an image is displayed in the display device, and the non-display area NDA is an area where various signal lines are arranged to display an image in the display area DA.

A plurality of data drivers DU which provide data signals to data lines DL and a plurality of data fan-out lines DFL, which deliver signals received from the data drivers DU to the data lines DL, may be disposed on the non-display area NDA.

A plurality of pixels defined at intersections of a plurality of data lines DL and a plurality of gate lines GL may be disposed on the display area DA. That is. FIG. 2 is an enlarged view of one (area 'A' in FIG. 1) of the pixels, and the display area DA may include a plurality of pixels substantially identical to the pixel illustrated in FIG. 2.

Referring to FIG. 3, a third polarizing layer POL3 may be disposed on the outside of the second substrate 500. The third polarizing layer POL3 may polarize light provided from a backlight unit BLU, which will be described later. Specifically, of light provided from the backlight unit BLU, only light oscillating in a specific direction may be transmitted, and the other light may be absorbed or reflected.

That is, in an exemplary embodiment, the third polarizing layer POL3 may be a linear polarizer that passes a polarization component oscillating in a specific direction.

In an exemplary embodiment, the third polarizing layer POL3 may be a polarizing film on which a polymer resin stretched in a specific direction and a light absorbing material that absorbs light oscillating in a specific direction are adsorbed. In an exemplary embodiment, the third polarizing layer POL3 may be made of a metal layer and may absorb or reflect some light and transmit some light. In an exemplary embodiment, the first polarizing layer POL1 may be a polarizing layer to which a wire grid polarizer (WGP) has been applied. This will be described in detail later.

In FIG. 3, the third polarizing layer POL3 is disposed on the outside of the second substrate 500. However, the inventive concept is not limited to this arrangement. That is, in an exemplary embodiment, the third polarizing layer POL3 may be disposed on the inside of the second substrate 500, that is, between the second substrate 500 and a gate electrode GE. In other words, in an exemplary embodiment, the third polarizing layer POL3 may be an in-cell polarizing layer.

A gate wiring layer (GL and GE) may be disposed on the second substrate 500. The gate wiring layer (GL and GE) may include a gate line GL which receives a driving signal and the gate electrode GE which protrudes from the gate line GL. The gate line GL may extend in a first direction. The first direction may be substantially the same as an x-axis direction of FIG. 2. The gate electrode GE may form three terminals of a thin-film transistor together with a source electrode SE and a drain electrode DE which will be described later.

The gate wiring layer (GL and GE) may include any one or more of an aluminum (Al)-based metal such as an aluminum alloy, a silver (Ag)-based metal such as a silver alloy, a copper (Cu)-based metal such as a copper alloy, a molybdenum (Mo)-based metal such as a molybdenum alloy, chrome (Cr), titanium (Ti), and tantalum (Ta). However, the above materials are merely examples, and the material that forms the gate wiring layer (GL and GE) is not limited to these materials. A metallic or polymer material having properties required to realize a desired display device can also be used to form the gate wiring layer (GL and GE).

The gate wiring layer (GL and GE) may have a single layer structure. However, the structure of the gate wiring layer (GL and GE) is not limited to the single layer structure, and the gate wiring layer (GL and GE) may also be a multilayer having at least two layers.

A gate insulating layer GI may be disposed on the gate wiring layer (GL and GE). The gate insulating layer GI may cover the gate wiring layer (GL and GE) and may be formed on the whole surface of the second substrate 500.

A semiconductor pattern layer 700 may be disposed on the gate insulating layer GI.

The semiconductor pattern layer 700 may include amorphous silicon or polycrystalline silicon. However, the material of the semiconductor pattern layer 700 is not limited to the above materials. In an exemplary embodiment, the semiconductor pattern layer 700 may include an oxide semiconductor.

The semiconductor pattern layer 700 may have various shapes, such as an island shape or a linear shape. When the semiconductor pattern layer 700 has a linear shape, it may be located under a data line DL and extend onto the gate electrode GE.

In an exemplary embodiment, the semiconductor pattern layer 700 may be patterned in substantially the same shape as a data wiring layer (DL, SE and DE) in all areas excluding a channel portion CH.

In other words, the semiconductor pattern layer 700 may overlap the data wiring layer (DL, SE and DE) in all areas excluding the channel portion CH.

The channel portion CH may be disposed between the source electrode SE and the drain electrode DE which face each other. The channel portion CH may electrically connect the source electrode SE and the drain electrode DE, and the specific shape of the channel portion CH is not limited to a particular shape.

An ohmic contact layer (not illustrated) heavily doped with an n-type impurity may be disposed on the semiconductor pattern layer 700. The ohmic contact layer may overlap all or part of the semiconductor pattern layer 700. However, in an exemplary embodiment in which the semiconductor pattern layer 700 includes an oxide semiconductor, the ohmic contact layer may be omitted.

When the semiconductor pattern layer 700 is an oxide semiconductor, it may include zinc oxide (ZnO). Furthermore, the semiconductor pattern layer 700 may be doped with one or more ions selected from gallium (Ga), indium (In), stannum (Sn), zirconium (Zr), hafnium (H), cadmium (Cd), silver (Ag), copper (Cu), germanium (Ge), gadolinium (Gd), titanium (Ti), and vanadium (V). For example, the semiconductor pattern layer 700 which is an oxide semiconductor may include any one or more of ZnO, ZnGaO, ZnInO, ZnSnO, GaInZnO, CdO, InO, GaO, SnO, AgO, CuO, GeO, GdO, HfO, TiZnO, InGaZnO, and InTiZnO. However, these are merely examples, and the type of the oxide semiconductor is not limited to the above examples.

The data wiring layer (DL, SE and DE) may be disposed on the semiconductor pattern layer 700. The data wiring layer (DL, SE and DE) includes the data line DL, the source electrode SE, and the drain electrode DE.

The data line DL may extend in a second direction, for example, in a y-axis direction in FIG. 2, and may intersect the gate line GL. The source electrode SE may branch off from the data line DL and extend onto the semiconductor pattern layer 700.

The drain electrode DE may be separated from the source electrode SE and may be disposed on the semiconductor pattern layer 700 to face the source electrode SE with respect to the gate electrode GE or the channel portion CH. The drain electrode DE may contact a pixel electrode PE, which will be described later. Thus, the drain electrode DE may be electrically connected to the pixel electrode PE.

The data wiring layer (DL, SE and DE) may have a single layer structure or a multilayer structure composed of one or more of nickel (Ni), cobalt (Co), titanium (Ti), silver (Ag), copper (Cu), molybdenum (Mo), aluminum (Al), beryllium (Be), niobium (Nb), gold (Au), iron (Fe), selenium (Se), and tantalum (Ta). In addition, the data wiring layer (DL, SE and DE) may be made of an alloy of any one of the above metals and one or more elements selected from titanium (Ti), zirconium (Zr), tungsten (W), tantalum (Ta), niobium (Nb), platinum (Pt), hafnium (H), oxygen (O), and nitrogen (N). However, the above materials are merely examples, and the material of the data wiring layer (DL, SE and DE) is not limited to the above materials.

In FIG. 2, one thin-film transistor is disposed in each pixel. However, the scope of the inventive concept is not limited to this case. That is, in an exemplary embodiment, the number of thin-film transistors disposed in one pixel may be more than one. In addition, if a plurality of thin-film transistors are disposed in one pixel, the pixel may be divided into a plurality of domains respectively corresponding to the thin-film transistors.

A second passivation layer PASSI2 may be disposed on the data wiring layer (DL, SE and DE) and the semiconductor pattern layer 700. The second passivation layer PASSI2 may be made of an inorganic insulating material or an organic insulating material.

The second passivation layer PASSI2 may include a contact hole that exposes at least part of the drain electrode DE.

The pixel electrode PE may be disposed on the second passivation layer PASSI2. The pixel electrode PE may be electrically connected to the drain electrode DE via the contact hole.

In an exemplary embodiment, the pixel electrode PE may be made of a transparent conductor such as indium tin oxide (ITO) or indium zinc oxide (IZO) or a reflective conductor such as aluminum.

In FIG. 2, the pixel electrode PE is shaped like a flat plate. However, the shape of the pixel electrode is not so limited. That is, in an exemplary embodiment, the pixel electrode PE may be a structure having one or more slits. Further, in an exemplary embodiment, one or more pixel electrodes may be provided. In this case, different voltages may be applied to the pixel electrodes, respectively.

Next, the first substrate 1000 will be described with reference to FIGS. 3 and 4.

A black matrix BM, the transflective layer TL, and the wavelength conversion layer WC may be disposed on the first substrate 1000.

The black matrix BM may extend in the first direction to overlap the gate line GL described above, or may extend in the second direction to overlap the data line DL described above.

Further, the black matrix BM may overlap the thin-film transistor described above.

The black matrix BM may block light incident from the outside or block light emitted from the inside. To this end, the black matrix BM may be made of a photosensitive resin containing a black pigment. However, the photosensitive resin is merely an example, and the material of the black matrix BM is not limited to this example. Any material having necessary physical properties for blocking light incident from the outside can be used as the material of the black matrix BM.

In an exemplary embodiment, the black matrix BM may be made of a metal material. The black matrix BM made of a metal material prevents external light from affecting the wavelength conversion layer WC by blocking the external light.

The transflective layer TL may be disposed on the black matrix BM. The transflective layer TL may transmit part of received light and reflect part of the received light.

In an exemplary embodiment, the transflective layer TL may pass light received from the wavelength conversion layer WC and reflect at least part of light received from the outside.

In an exemplary embodiment, the transflective layer TL may include a metal to reflect light. The metal used as the material of the transflective layer TL may be, for example, silver (Ag).

Figure 5:
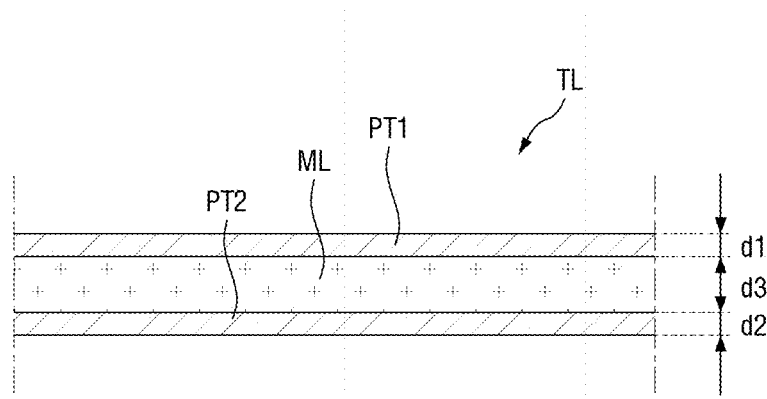
FIG. 5 is a partial cross-sectional view of the display device according to an exemplary embodiment.

FIG. 5 is a partial cross-sectional view of the display device according to an exemplary embodiment.

In FIG. 5, a cross-section of a transflective layer TL according to an embodiment is illustrated.

In an exemplary embodiment, the transflective layer TL may include a first protective layer PT1, an intermediate layer ML, and a second protective layer PT2.

The first protective layer PT1, the intermediate layer ML and the second protective layer PT2 may be sequentially stacked. In other words, the first protective layer PT1 and the second protective layer PT2 may be disposed with the intermediate layer ML between them. That is, the intermediate layer ML may be interposed between the first protective layer PT1 and the second protective layer PT2.

In an exemplary embodiment, the first protective layer PT1 and the second protective layer PT2 may be made of a transparent material, and the intermediate layer ML may be made of a reflective metal.

For example, the first protective layer PT1 and the second protective layer PT2 may be made of indium tin oxide (ITO) or indium zinc oxide (IZO), and the intermediate layer ML may be made of silver (Ag). However, this is merely an example, and the material of the transflective layer TL is not limited to this example.

In an exemplary embodiment, the first protective layer FT may have a first thickness d1, the middle layer ML may have a third thickness d3, and the second protective layer PT2 may have a second thickness d2.

In an exemplary embodiment, the first thickness d1 and the second thickness d2 may be less than 100 Å, and the third thickness d3 may be 100 to 200 Å.

When the third thickness d3 is as described above, the transflective layer TL can have transflective properties for transmitting some light and reflecting some light.

In an exemplary embodiment, the reflectance of the transflective layer TL may be 20 to 70%.

Referring again to FIG. 3, the display device according to an exemplary embodiment may further include a light blocking filter FI disposed on the transflective layer TL.

The light blocking filter FI may block light having a specific wavelength. In an exemplary embodiment, the display device may be provided with blue light as a backlight. In this case, the light blocking filter FI may block the blue light.

In other words, when the backlight unit (not illustrated) provides light in a blue wavelength band, the light having the blue wavelength band may remain even after passing through the wavelength conversion layer WC. However, if the light blocking filter F1 is applied as described above, the remaining light in the blue wavelength band can be blocked, thereby increasing the color gamut of light (green or red) emitted from the wavelength conversion layer WC.

The light blocking filter FI may overlap a green wavelength conversion layer WC_G and/or a red wavelength conversion layer WC_R of the wavelength conversion layer WC. This will be described in detail later.

The wavelength conversion layer WC may be disposed on the light blocking filter FI. The wavelength conversion layer WC may shift the wavelength of received light.

In an exemplary embodiment, the wavelength conversion layer WC may include quantum dots. The color of light emerging from the wavelength conversion layer WC may vary depending on the size, type, and amount of quantum dots included in the wavelength conversion layer WC. For example, the wavelength conversion layer WC may emit any one of green light, red light, and blue light depending on the size, type, and amount of the quantum dots.

The quantum dots included in the wavelength conversion layer WC may be, for example, II-VI quantum dots including CdSe/ZnS, CdSe/CdS/ZnS, ZnSe/ZnS or ZnTe/ZnSe, III-V quantum dots including InP/ZnS, or quantum dots including CuInS(2)/ZnS.

In an exemplary embodiment, the wavelength conversion layer WC may directly contact the transflective layer TL and protrude to a certain height from the transflective layer TL. Accordingly, one wavelength conversion layer WC may have an upper end US and sidewalls SW.

Although the upper end US is illustrated as being flat in FIG. 3, it is not necessarily flat. In an exemplary embodiment, the upper end US may be convex or concave.

The capping layer CA may be disposed on the light blocking filter FI and the wavelength conversion layer WC. In an exemplary embodiment, the capping layer CA may cover the light blocking filter FT and the wavelength conversion layer WC. Specifically, the capping layer CA may cover the sidewalls SW and the upper end US of the wavelength conversion layer WC.

In an exemplary embodiment, the capping layer CA may include at least one inorganic layer. The inorganic layer may include any one or more of, e.g., silicon nitride ($SiN_x$), silicon oxide ($SiO_x$), and silicon oxynitride ($SION_x$).

That is, in an exemplary embodiment, the capping layer CA may be a single layer or a laminate of a plurality of layers.

In an exemplary embodiment, the capping layer CA may be a yellow recycling filter (YRF). That is, the capping layer CA may be an optical filter that reflects green light and red light, and transmits blue light.

When the capping layer CA serves to reflect green light and red light, it may reflect the green light and the red light emerging from the sidewalls SW of the wavelength conversion layer WC back to the wavelength conversion layer WC. That is, leaked light can be recycled, and light emerging from the wavelength conversion layer WC can be directed toward the front.

A planarization layer OC may be disposed on the capping layer CA. The planarization layer OC may include an organic and/or inorganic insulating material. The planarization layer OC may be formed over the entire area of the first substrate 1000 and planarize steps formed on the first substrate 1000. Although the planarization layer OC is illustrated as being a single layer in FIG. 3, it is not necessarily a single layer. In an exemplary embodiment, the planarization layer OC may be a multilayer including at least two layers.

The first polarizing layer POL1 may be disposed on the planarization layer OC. The first polarizing layer POL1 may polarize light that passed through a liquid crystal layer LC after having been emitted from the backlight unit (not illustrated). Specifically, the first polarizing layer POL1 may transmit only light oscillating in a specific direction and reflect the other light among the light that passed through the liquid crystal layer LC.

In an exemplary embodiment, the first polarizing layer POL1 may be a linear polarizer that transmits a polarization component oscillating in a specific direction.

In addition, in an exemplary embodiment, the first polarizing layer POL1 may be an in-cell polarizing layer disposed between the first substrate 1000 and the second substrate 500.

In an exemplary embodiment, polarization directions of the first polarizing layer POL1 and the third polarizing layer POL3 may be different from each other. As used herein, the term "polarization direction" denotes the direction of a polarization component of light that passes through a polarization layer.

In view of this, the oscillation direction, that is, the polarization direction of light transmitted through the first polarizing layer POL1, may be the same as or different from the oscillation direction, that is, the polarization direction of light transmitted through the third polarizing layer POL3. For example, in an exemplary embodiment in which the third polarizing layer POL3 transmits light oscillating in the first direction, the first polarizing layer POL1 may transmit light oscillating in the first direction or transmit light oscillating in the second direction (e.g., a direction perpendicular to the first direction) different from the first direction.

In an exemplary embodiment, the first polarizing layer POL1 may include a WGP that linearly polarizes received light.

Accordingly, the first polarizing layer POL1 may include fine metal wire patterns arranged parallel to each other along a direction. The fine metal wire patterns may have a line width of about 60 nm or less and a thickness of about 150 nm or less. However, the line width and the thickness are exemplary and may vary according to design needs. Of light arriving at the first polarizing layer POL1, only light incident on the first polarizing layer POL1 in parallel to the fine metal wire patterns may pass through the first polarizing layer POLL. Accordingly, the first polarizing layer POL1 can perform a polarizing function.

The first polarizing layer POL1 may be made of a metal having a high reflectance. For example, the first polarizing layer POL1 may be include one or more of aluminum, gold, silver, copper, chromium, iron, nickel and molybdenum. However, these materials are merely examples, and the material of the first polarizing layer POL1 is not limited to the above examples.

In FIG. 3, the first polarizing layer POL1 is illustrated as a single layer. However, in an exemplary embodiment, the first polarizing layer POL1 may have a multilayer structure composed of at least two layers.

A third passivation layer PASSI3 may be disposed on the first polarizing layer POLL.

A common electrode CE may be disposed on the third passivation layer PASSI3. The common electrode CE may be an unpatterned whole-surface electrode. A common voltage may be applied to the common electrode CE. When different voltages are applied to the common electrode CE and the pixel electrode PE, a certain electric field may be formed between the common electrode CE and the pixel electrode PE.

The liquid crystal layer LC having a plurality of liquid crystal molecules may be disposed between the first substrate 1000 and the second substrate 500. The liquid crystal layer LC may be controlled by an electric field formed between the common electrode CE and the pixel electrode PE. By controlling the movement of liquid crystals disposed in the liquid crystal layer LC, it is possible to control light needed to display an image.

While an exemplary embodiment including the common electrode CE being formed on the first substrate 1000 has been described above, the inventive concept is not limited to this case. That is, in an exemplary embodiment, the common electrode CE may be formed on the second substrate 500, which is a lower substrate.

In addition, while a case where the wavelength conversion layer WC is formed on an upper substrate has been described above, the inventive concept is not limited to this case, and the wavelength conversion layer WC can also be formed on the lower substrate.

Next, a description will be made with reference to FIG. 4.

Referring to FIG. 4, the wavelength conversion layer WC in the display device according to an exemplary embodiment may include the red wavelength conversion layer WC_R, the green wavelength conversion layer WC_G, and a blue wavelength conversion layer WC_B.

In an exemplary embodiment, a plurality of wavelength conversion layers WC may be provided. In this case, the wavelength conversion layers WC may be separated from each other.

In an exemplary embodiment, each space formed between the wavelength conversion layers WC may overlap the black matrix BM.

In an exemplary embodiment, the transflective layer TL may overlap the red wavelength conversion layer WC_R, the green wavelength conversion layer WC_G, and the blue wavelength conversion layer WC_B.

That is, in an exemplary embodiment, the transflective layer TL may be formed over the entire surface.

In an exemplary embodiment, the light blocking filter FI may overlap the red wavelength conversion layer WC_R and the green wavelength conversion layer WC_G and may not overlap the blue wavelength conversion layer WC_B.

In an exemplary embodiment in which the light blocking filter FI blocks blue light, the light blocking filter FI overlapping the red wavelength conversion layer WC_R and the green wavelength conversion layer WC_G may block the blue light mixed with red light and green light, thereby improving the color gamut of green and red.

The display device according to an exemplary embodiment may further include the second polarizing layer POL2 disposed on the opposite side, i.e., on the other surface of the first substrate 1000.

In other words, the second polarizing layer POL2 may be disposed on the outside of the first substrate 1000, and the wavelength conversion layer WC and the like described above may be disposed on the inside of the first substrate 1000.

That is, the first substrate 1000 may be disposed between the second polarizing layer POL2 and the wavelength conversion layer WC.

In an exemplary embodiment, the second polarizing layer POL2 may be a circular polarizer. In other words, in an exemplary embodiment, the second polarizing layer POL2 may include a λ/4 retardation layer (not illustrated). That is, light passing through the second polarizing layer POL2 may be in a circularly polarized state. Accordingly, polarization directions of the first polarizing layer POL1 and the second polarizing layer POL2 may be different from each other. In other words, a polarization component of light passing through the first polarizing layer POL1 and a polarizing component of light passing through the second polarizing layer POL2 may have different directions.

When the display device according to the exemplary embodiment includes the second polarizing layer POL2, which is a circular polarizer, and the transflective layer TL as described above, external light can be prevented from affecting the display performance of the display device. Specifically, external light reflectance can be lowered. Specifically, when external light reaches the wavelength conversion layer WC, the wavelength conversion layer WC may emit light due to quantum dots included in the wavelength conversion layer WC. That is, interference may occur due to the external light.

However, if a circular polarizer is disposed on the outside of the first substrate 1000, the external light can be prevented from reaching the wavelength conversion layer WC.

Even if some of the external light passes through the second polarizing layer POL2, the light may be partially reflected by the transflective layer TL, and the reflected light may be blocked by the second polarizing layer POL2. Therefore, the reflected light cannot get out of the display device.

That is, by adopting the above-described component, the external light reflectance can be significantly reduced.

In FIGS. 3 and 4, one wavelength conversion layer WC is disposed in one pixel. However, the inventive concept is not limited to this case. In other words, in an exemplary embodiment, two or more wavelength conversion layers WC may be disposed in one pixel.

Hereinafter, display devices according to other exemplary embodiments will be described. In the following exemplary embodiments, the same components as those already described above will be indicated by the same reference numerals, and a redundant description of the same components will be omitted or given briefly.

Figure 6:
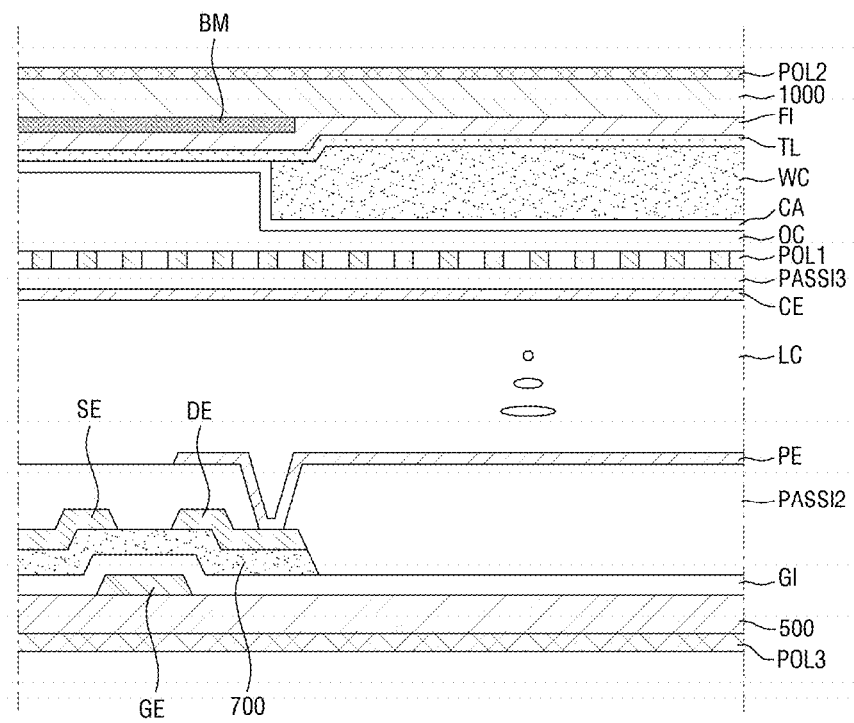
FIG. 6 and FIG. 7 are cross-sectional views of a display device according to an exemplary embodiment.
Figure 7:
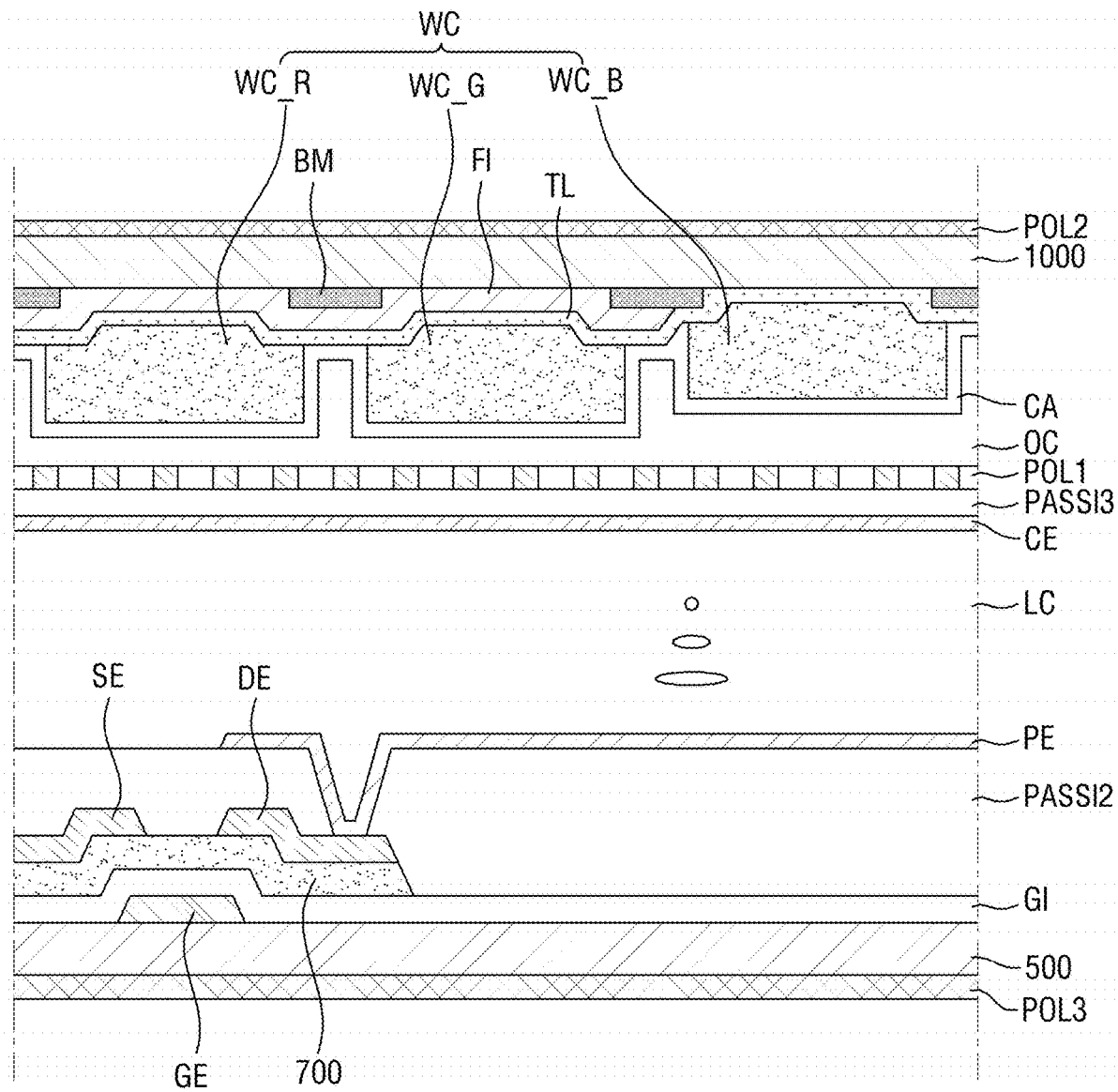

FIGS. 6 and 7 are cross-sectional views of a display device according to an exemplary embodiment. Referring to FIGS. 6 and 7, the display device according to this exemplary embodiment is different from display device according to the exemplary embodiment of FIGS. 3 and 4 in that a light blocking filter FI is formed on a black matrix BM and a first substrate 1000, and that a transflective layer TL is formed on the light blocking filter FI.

In an exemplary embodiment, the order in which the light blocking filter FI and the transflective layer TL are stacked may be reversed. That is, the light blocking filter FI may be formed first, and then the transflective layer TL may be formed on the light blocking filter FI.

In addition, a wavelength conversion layer WC may be formed on the transflective layer TL. Accordingly, in an exemplary embodiment, the transflective layer TL and the wavelength conversion layer WC may directly contact each other.

Referring to FIG. 7, the light blocking filter FI may overlap a red wavelength conversion layer WC_R and a green wavelength conversion layer WC_G. In an exemplary embodiment, the light blocking filter FI may not overlap a blue wavelength conversion layer WC_B.

In addition, as described above with reference to FIGS. 3 and 4, a capping layer CA may be disposed on the wavelength conversion layer WC. The capping layer CA may cover each space between the wavelength conversion layers WC. In this case, the capping layer CA may directly contact the transflective layer TL.

Figure 8:
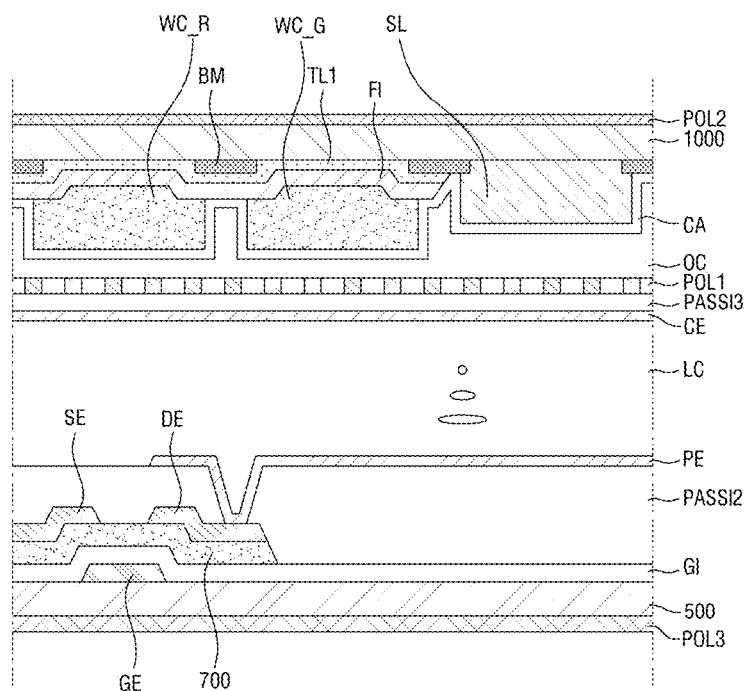
FIG. 8 is a cross-sectional view of a display device according to an exemplary embodiment.

FIG. 8 is a cross-sectional view of a display device according to an exemplary embodiment.

Referring to FIG. 8, the display device according to this exemplary embodiment is different from the display device according to the exemplary embodiment of FIG. 4 in that it includes a light transmitting layer SL disposed adjacent to a wavelength conversion layer WC.

In an exemplary embodiment, the light transmitting layer SL may be disposed adjacent to the wavelength conversion layer WC. Specifically, some of a plurality of wavelength conversion layers WC may be replaced with the light transmitting layer SL.

In an exemplary embodiment, the light transmitting layer SL may replace a blue wavelength conversion layer WC_B.

As described above, a backlight in a display device according to an exemplary embodiment may provide blue light. In an exemplary embodiment in which the backlight provides blue light, the light transmitting layer SL may realize a blue color by passing the blue light.

In an exemplary embodiment, the light transmitting layer SL may include a light scattering agent. The light scattering agent may include, for example, TiO2. However, this is merely an example, and the material of the light scattering agent is not limited to TiO2.

In an exemplary embodiment, the light transmitting layer SL may include a blue pigment. In this case, light passing through the light transmitting layer SL may have clearer blue.

In an exemplary embodiment, the light transmitting layer SL may not overlap a transflective layer TL1. That is, since the light transmitting layer SL does not include quantum dots, the possibility of interference due to external light is low. Therefore, the transflective layer TL1 can be omitted.

However, in an exemplary embodiment, the transflective layer TL1 and the light transmitting layer SL may overlap each other. That is, the transflective layer TL1 may be formed over the entire surface of the wavelength conversion layer WC and the light transmitting layer SL.

In an exemplary embodiment in which the light transmitting layer SL replaces the blue wavelength conversion layer WC_B, a capping layer CA may cover the light transmitting layer SL.

However, in an exemplary embodiment, the capping layer CA may cover only the wavelength conversion layer WC and not cover the light transmitting layer SL.

In other words, the transflective layer TL1 may overlap a red wavelength conversion layer WC_R and/or a green wavelength conversion layer WC_G, and may not overlap the light transmitting layer SL.

Figure 9:
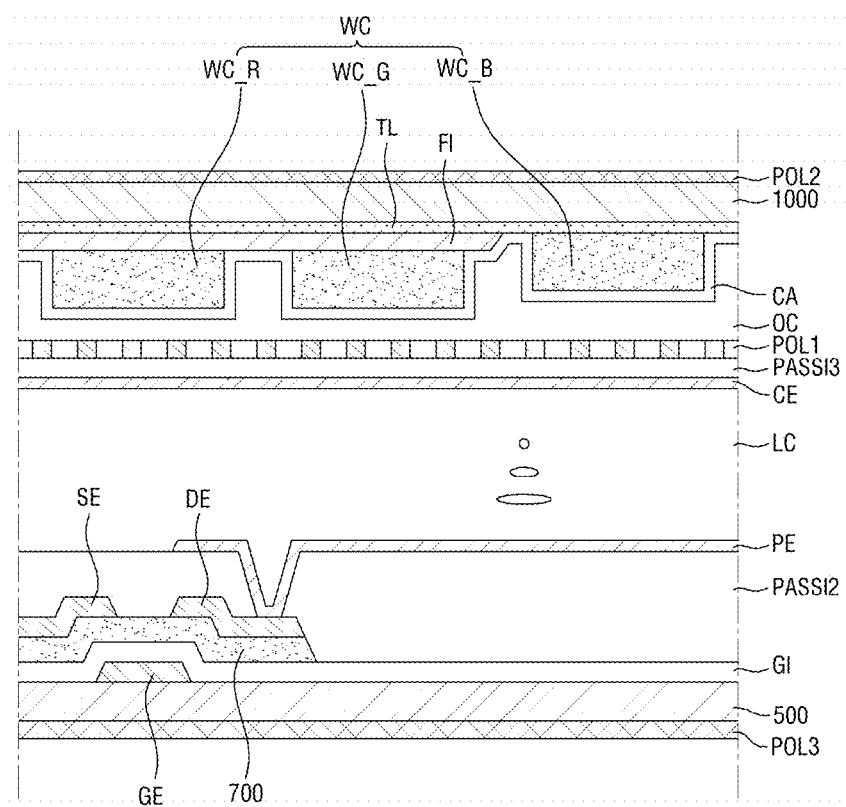
FIG. 9 is a cross-sectional view of a display device according to an exemplary embodiment.

FIG. 9 is a cross-sectional view of a display device according to an exemplary embodiment.

Referring to FIG. 9, the display device according to the this exemplary embodiment is different from the display device according to the exemplary embodiment of FIG. 4 in that a black matrix BM is not disposed on a first substrate 1000.

In an exemplary embodiment, the black matrix BM formed on the first substrate 1000 may be omitted.

The black matrix BM formed on the first substrate 1000 may perform the function of reflecting external light. However, if the display device includes a transflective layer TL and a second polarizing layer POL2, external light can be effectively blocked. Therefore, the black matrix BM can be omitted.

Hereinafter, a method of manufacturing a display device according to an exemplary embodiment will be described. Some of the components described below may be the same as those of the liquid crystal displays according to the above-described exemplary embodiments, and thus a description of these components will be omitted in order to avoid redundancy.

FIGS. 10 through 16 are cross-sectional views illustrating a method of manufacturing a display device according to an exemplary embodiment.

Referring to FIGS. 10 through 16, the manufacturing method according to this exemplary embodiment includes forming a transflective layer TL on a surface of a first substrate 1000, forming a wavelength conversion layer WC on the transflective layer TL, forming a capping layer CA on the wavelength conversion layer WC, forming a first polarizing layer POL1 on the capping layer CA, and forming a second polarizing layer POL2 on the other surface of the first substrate 1000.

Figure 10:
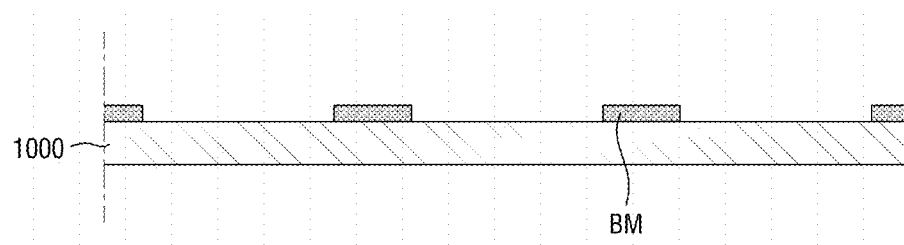
FIG. 10, FIG. 11.

Referring to FIG. 10, the first substrate 1000 may be prepared.

In an exemplary embodiment, a black matrix BM may be formed on a surface of the first substrate 1000.

As described above, in an exemplary embodiment, the black matrix BM may be omitted (see FIG. 9).

Figure 11:
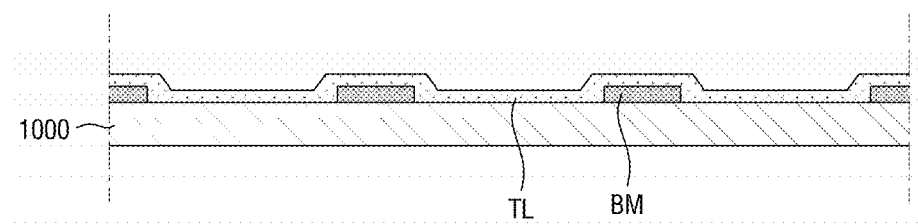

Referring to FIG. 11, the transflective layer TL may be formed on the first substrate 1000.

The transflective layer TL may be substantially the same as that described above in the display devices of the previously-described exemplary embodiments.

In an exemplary embodiment, the transflective layer TL may be formed over the entire surface (see FIG. 4). However, in an exemplary embodiment, the transflective layer TL may be partially formed on the first substrate 1000 (see FIG. 8).

Figure 12:
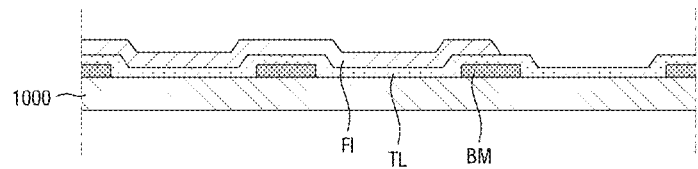
FIG. 12, FIG. 13.

Next, referring to FIG. 12, a light blocking filter FI may be formed on the transflective layer TL. The light blocking filter FI may be substantially the same as that described above in the display devices of the previously-described exemplary embodiments.

In an exemplary embodiment, the light blocking filter FI may be partially formed on the first substrate 1000.

The order in which the forming of the transflective layer TL in FIG. 11 and the forming of the light blocking filter FI in FIG. 12 are performed can be reversed.

If the order is reversed, the resultant structure may be substantially the same as that described above with reference to FIG. 7.

Figure 13:
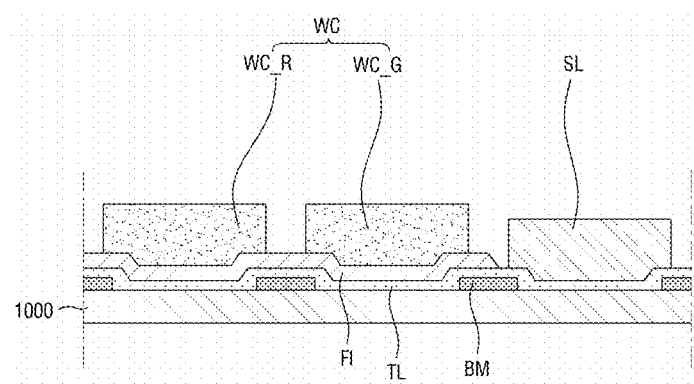

Next, referring to FIG. 13, the wavelength conversion layer WC may be formed on the transflective layer TL. The wavelength conversion layer WC may be substantially the same as that described above in the display devices according to the previously-described exemplary embodiments.

In an exemplary embodiment, the manufacturing method may further include forming a light transmitting layer SL adjacent to the wavelength conversion layer WC.

In FIG. 13, the light transmitting layer SL is formed to replace a blue wavelength conversion layer WC_B.

In an exemplary embodiment, a red wavelength conversion layer WC_R and/or a green wavelength conversion layer WC_G may be formed to overlap the light blocking filter F, and the light transmitting layer SL may be formed to not overlap the light blocking filter F.

Figure 14:
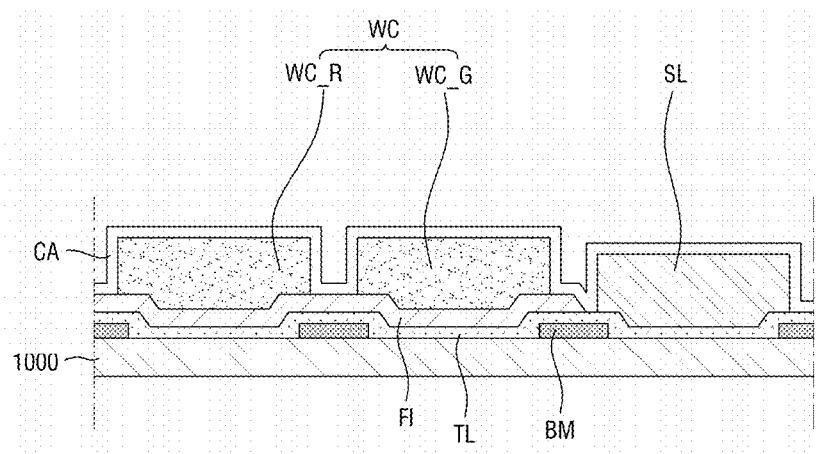
FIG. 14, FIG. 15, and FIG. 16 are cross-sectional views illustrating a method of manufacturing a display device according to an exemplary embodiment.

Referring to FIG. 14, the capping layer CA may be formed on the wavelength conversion layer WC and the light transmitting layer SL.

The capping layer CA may be substantially the same as that described above in the display devices according to the previously-described exemplary embodiments.

Figure 15:
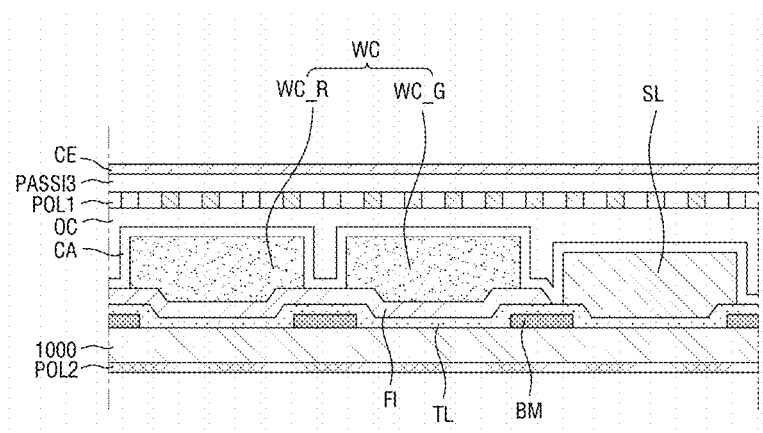

Referring to FIG. 15, a planarization layer OC, the first polarizing layer POL1, a third passivation layer PASSI3, and a common electrode CE are sequentially formed on the capping layer CA, and the second polarizing layer POL2 is formed on the other surface of the substrate 1000.

The planarization layer OC, the first polarizing layer POL1, the third passivation layer PASSI3 and the common electrode CE may be substantially the same as those described above in the display devices according to the previously-described exemplary embodiments.

As described above in the display devices according to the previously-described exemplary embodiments, polarization directions of the first polarizing layer POL1 and the second polarizing layer POL2 may be different from each other. That is, the first polarizing layer POL1 may be a linear polarizing layer, and the second polarizing layer POL2 may be a circular polarizing layer.

While the forming of the second polarizing layer POL2 has been described in combination with the forming of the first polarizing layer POL1 for ease of description, the inventive concept is not limited to this case.

That is, the forming of the second polarizing layer POL2 on the other surface of the first substrate 1000 can be performed in the middle of, at the beginning, or at the end of the method of manufacturing a display device according to exemplary embodiments.

Figure 16:
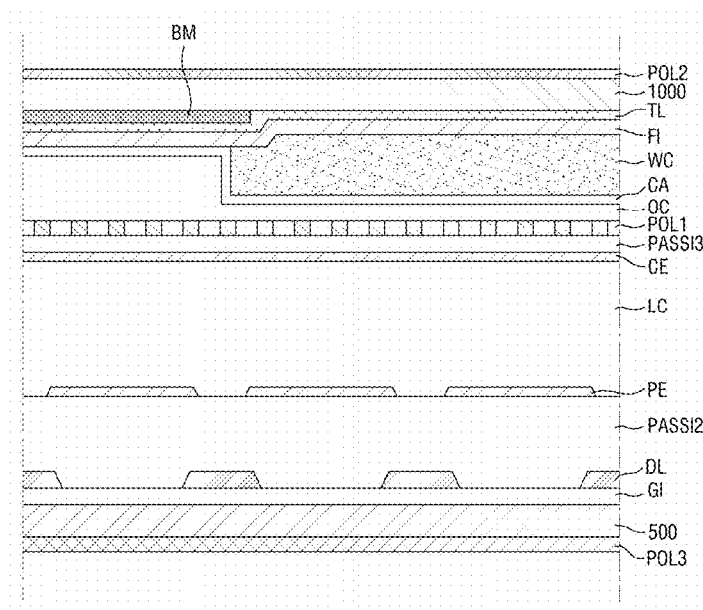

Referring to FIG. 16, the first substrate 1000 may be bonded to a second substrate 500 facing the first substrate 1000.

Since the second substrate 500 and a plurality of components formed on the second substrate 500 are substantially the same as those described above in the display devices according to the embodiments, a detailed description of the second substrate 500 and the components will be omitted.

Figure 17:
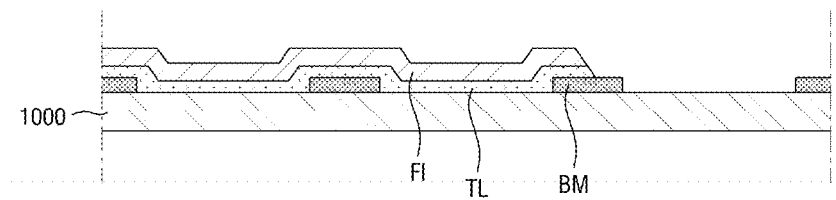
FIG. 17 is a cross-sectional view illustrating a method of manufacturing a display device according to an exemplary embodiment.

FIG. 17 is a cross-sectional view illustrating a method of manufacturing a display device according to an exemplary embodiment.

Referring to FIG. 17, the method of manufacturing a display device according to this exemplary embodiment may further include etching a transflective layer TL using a light blocking filter FI as a mask after forming the light blocking filter FI.

The transflective layer TL may be partially disposed on a first substrate 1000 as described above with reference to FIG. 8. To this end, the transflective layer TL may be etched using the light blocking filter FH as a mask.

In this case, the light blocking filter FI and the transflective layer TL may have substantially the same shape. That is, the light blocking filter FI and the transflective layer TL may completely overlap each other.

In addition, a light transmitting layer SL may be placed in a portion where the transflective layer TL has been etched, and the resultant structure may be substantially the same as that described above with reference to FIG. 8.

Exemplary embodiments of the inventive concept provide suppression of interference due to external light by reducing external light reflectance.

However, the effects of the inventive concept are not restricted to the one set forth herein. The above and other effects of the inventive concept will become more apparent to one of daily skill in the art to which the inventive concept pertains by referencing the claims.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display device comprising:
    a first substrate;
    a light blocking filter on the first substrate; and
    a transflective layer disposed on the light blocking filter, wherein the light blocking filter is disposed between the first substrate and the transflective layer.

2. The display device of claim 1, further comprising a wavelength conversion layer on the transflective layer.

3. The display device of claim 2, further comprising a capping layer on the wavelength conversion layer.

4. The display device of claim 3, further comprising a planarization layer on the capping layer.

5. The display device of claim 2, wherein the wavelength conversion layer comprises a first wavelength conversion layer configured to emit a first light and a second wavelength conversion layer configured to emit a second light which has a wavelength different from the first light.

6. The display device of claim 5, further comprising a light transmitting layer disposed adjacent to the wavelength conversion layer.

7. The display device of claim 6, wherein the light blocking filter overlaps the wavelength conversion layer and does not overlap the light transmitting layer.

8. The display device of claim 6, wherein the transflective layer is in direct contact with the first substrate in an area overlapping the light transmitting layer.

9. The display device of claim 6, wherein a maximum height of the wavelength conversion layer with respect to the first substrate is greater than a maximum height of the transmitting layer.

10. The display device of claim 5, further comprising a black matrix disposed between the first wavelength conversion layer and the second wavelength conversion layer in a plan view.

11. The display device of claim 10, wherein the transflective layer is in direct contact with at least a portion of the black matrix.

12. The display device of claim 1, wherein the transflective layer comprises a first protective layer, an intermediate layer, and a second protective layer.

13. The display device of claim 1, wherein the intermediate layer has a thickness of 100 to 200 Å.

14. The display device of claim 1, wherein the transflective layer has a reflectance of 20 to 70%.

15. The display device of claim 1, wherein the light blocking layer is configured to block a blue light.

* * * * *